(12) United States Patent
McElroy

(10) Patent No.: US 8,985,613 B2
(45) Date of Patent: Mar. 24, 2015

(54) AIRCRAFT TOWBAR WITH RAPID WHEEL DEPLOYMENT AND METHOD FOR EFFICIENTLY MOVING AIRCRAFT THEREWITH

(71) Applicant: Daniel J. McElroy, Columbus, IN (US)

(72) Inventor: Daniel J. McElroy, Columbus, IN (US)

( * ) Notice: Subject to any disclaimer, the term of this patent is extended or adjusted under 35 U.S.C. 154(b) by 32 days.

(21) Appl. No.: 13/707,751

(22) Filed: Dec. 7, 2012

(65) Prior Publication Data

US 2014/0161579 A1   Jun. 12, 2014

(51) Int. Cl.
 B64F 1/22 (2006.01)
 B60D 1/14 (2006.01)
(52) U.S. Cl.
 CPC .. B64F 1/224 (2013.01); B60D 1/14 (2013.01)
 USPC .......................... 280/493; 280/476.1; 280/475
(58) Field of Classification Search
 CPC ............. B64F 1/224; B64F 1/22; B60D 1/14; B60D 1/145; B60D 1/155; B60D 1/66; B60D 1/665
 USPC ....................................... 280/493, 476.1, 475
 See application file for complete search history.

(56) References Cited

U.S. PATENT DOCUMENTS

| | | | | |
|---|---|---|---|---|
| 3,089,557 A * | 5/1963 | Davis et al. | ................... | 180/14.7 |
| 3,709,522 A * | 1/1973 | Olson | ........................... | 280/453 |
| 3,868,128 A * | 2/1975 | Mahieu | ........................ | 280/453 |
| 4,991,862 A * | 2/1991 | Tsao et al. | .................... | 280/421 |
| 5,709,271 A * | 1/1998 | Bassett | ............................. | 172/4 |
| 6,848,702 B1 * | 2/2005 | Williams | ...................... | 280/475 |

\* cited by examiner

*Primary Examiner* — Kevin Hurley
*Assistant Examiner* — Michael Stabley
(74) *Attorney, Agent, or Firm* — Taylor IP, P.C.

(57) ABSTRACT

A towbar includes a body and a carriage assembly mounted to the body for movement between a retracted position in which wheels on the carriage assembly are elevated above the ground and a support position in which the wheels support the towbar on the ground, wherein the towbar is configured for rapid deployment of the carriage assembly from the retracted position to the support position. Rapid deployment is provided by a hydraulic actuator and an accumulator that can store fluid pressure, such that controllably discharging the accumulator drives the actuator to move the carriage assembly. A method is disclosed using the towbar to move an aircraft such that the accumulator is charged with pressure before the towbar is decoupled from nose gear.

13 Claims, 2 Drawing Sheets

AIRCRAFT TOWBAR WITH RAPID WHEEL DEPLOYMENT AND METHOD FOR EFFICIENTLY MOVING AIRCRAFT THEREWITH

FIELD

The technology relates to aircraft towbars and also to an efficient method for moving an aircraft using a towbar.

BACKGROUND

In commercial aircraft operations, an aircraft is conventionally towed by means of a tractor equipped with a towbar that is removably coupled to nose gear of the aircraft. Ground crews operate the tractor and towbar to move the aircraft during an aircraft departure operation, for example, to push the aircraft away from the gate into a position on the tarmac at which the towbar is decoupled from the nose gear, the tractor pulls clear and the aircraft is free to taxi under its own power.

Conventional towbars include wheels that support the towbar body above the ground and which allow the towbar to be maneuvered around by the tractor when not coupled to nose gear. When the towbar is coupled to nose gear, the wheels must be retracted upwardly free from the ground, thereby allowing the towbar to be held suspended between the tractor and the nose gear. When the aircraft has been moved into a desired position, the towbar must be decoupled, but not before the towbar wheels have been deployed to the ground in the support position.

Conventional towbars utilize a hydraulic hand pump and cylinder in a closed hydraulic system to "pump" from a retracted position down to the support position.

Towbars differ by manufacturer and aircraft type but are generally similar in design. Depending on type, each towbar typically weighs approximately 400 to 800 pounds. One end has an eyelet type of socket that matches up with a "pintle" hitch receiver that is standard on all push tugs. The other end of the towbar has a unique, for each airplane type, connector ("head") that attaches the towbar to the nose-wheel of that aircraft. Over the years there has been a lot of engineering and development on this head to make it fast to connect and disconnect to the airplane. This head has a safety feature built in that has the ability to shear or break or in various fashions release potential side-loads to the towbar without completely disconnecting from the airplane. The steering systems on larger aircraft are hydraulically powered and this hydraulic powering is disabled during the push back operation but, if the pilot mistakenly connects the hydraulic power or the bypassing of it fails, the towbar can be immediately susceptible to an action that can be unsafe to men and equipment. Usually this is done with a "shear" bolt installed in the head of the towbar that is designed to shear before the side load gets too great. The push operation is then stopped, the reason for the hydraulic powering is found and corrected and the shear bolt is replaced and the push recommences.

As mentioned, on current towbars the wheels are "pumped" down with a hand pump and brought up by opening a valve at the pump that allows the hydraulic fluid to return to the pump's reservoir and they are brought up with large return springs. One might argue that the whole design could be reversed such that the springs could be used to bring the wheels down instead of up (and use the pump to move the wheels up), however this would be problematic in practice, as the springs would only lower the wheels until they contacted the ground and there would be no way to "fine tune" a lifting force to elevate the towbar sufficiently as needed to decouple it from the nose gear.

Typically, the push operation requires four people. One person drives the tug, one person walks the airplane back and wears a headset that keeps him in communication with the pilot and is the person in charge of the push, and two people who walk below the wingtips confirming clearance for the airplane as it is being pushed. The team pushes the airplane back far enough to allow the captain to turn out of the ramp area once released by a controller of the ramp area.

Conventionally, while the tug is pushing the plane via the towbar, the towbar has to be free from the ground. But once stopped, to disconnect the airplane, the end of the towbar nearer the airplane must have a set of wheels lowered to pick up the weight and allow the tug to pull the towbar away from the airplane. The current system uses a closed hydraulic system. There is a simple hydraulic pump mounted atop the towbar that connects to a cylinder via a hydraulic line that is hand pumped to cause a set of wheels to extend and pick up the weight for that end of the towbar. Once the wheels are pumped down and the head end of the towbar is aligned with the nose wheel connect point of the towbar, the weight is counter balanced, and the head can be disconnected from the nose wheel and the tug driver is given the command from the ramp person to pull away.

The time that it takes to pump the wheels down on a conventional towbar takes away from efficient operation, The captain has already started the engine during the push operation so as to be ready to move under ship power when the towbar is completely disconnected and clear of the airplane, The engine is running while this hand pumping goes on, so the aircraft is burning fuel while waiting for the ground crew to finish pumping the wheels down, The pumping operation requires several seconds, yet these seconds are costly when, for example, aircraft engines are consuming 600 pounds of fuel per hour, in a fleet running thousands of departures a day.

SUMMARY

In an embodiment, a towbar for towing an aircraft is provided. The towbar includes an elongate body having a forward end adapted for coupling to a nose gear of an aircraft and a rearward end adapted for coupling to a tractor. The towbar further includes a carriage assembly having a carriage frame and at least one rotatable wheel, wherein the frame is movably mounted to the body for movement between: (a) a retracted position in which the wheel is held upwardly, proximally to the body; and (b) a support position in which the wheel is extended downwardly to the ground to support the body elevated above the ground when the rearward end is decoupled from the nose gear. A hydraulic actuator is configured to move the carriage assembly between the retracted and support positions. A hydraulic circuit is configured to controllably supply fluid pressure for driving the actuator. A manual pump is provided to deliver pressure to the hydraulic circuit. Additionally, a hydraulic accumulator is provided to store hydraulic pressure for driving the actuator at a selected time. Various configurations are possible, but in one embodiment, the hydraulic circuit has a valve movable between at least first and second positions, such that in the first position the accumulator is in hydraulic communication with the manual pump to allow the pump to charge the accumulator with fluid pressure and in the second position the pump is in fluid communication with the actuator, whereby discharge pressure from the accumulator drives the actuator to move the carriage assembly toward the support position.

Advantageously, the accumulator can be pre-charged with hydraulic pressure at a convenient time for a ground crew, prior to the time that the towbar wheels need to be deployed to support the towbar on the ground, such as when the aircraft has been stopped and the ground crew is ready to decouple the towbar from the nose gear. Discharging the accumulator rapidly drives the carriage assembly to the support position. This saves significant time over conventional systems in which the actuator is driven by manual pumping to move the carriage assembly—a slow process during which the aircraft crew and passengers are waiting and the aircraft engines are consuming fuel. By reducing the amount of time needed to actuate the towbar wheels, the improved towbar described herein allows the ground crew to decouple the towbar more quickly and move it clear of the aircraft. The time savings that equates to lower aircraft fuel consumption, operation costs, and allows the aircraft to taxi sooner.

In an embodiment, the towbar additionally includes an auxiliary pump arranged to deliver pressurized fluid to charge the boost accumulator upon, wherein the auxiliary pump is driven by compressive or tensile forces through the towbar that result from pushing or pulling the aircraft. This results in automatically charging the accumulator while the tractor is moving and/or stopping the aircraft. The auxiliary pump may include a piston-cylinder assembly mounted to the body to be axial displaced as a result of compressive or tensile forces transmitted through the towbar when the tractor pushes or pulls an aircraft.

Also described herein is a method of efficiently moving and decoupling an aircraft using a towbar, that includes a body having forward section adapted for coupling to a nose gear of an aircraft and a rearward end coupled to a tractor, a carriage assembly including a carriage frame, at least one wheel rotatably mounted to the carriage frame, the carriage frame being movably mounted to the body for movement between (a) a retracted position in which the wheel is held upwardly and (b) a support position in which the wheel is extended downwardly to support the towbar on the ground; a hydraulic actuation system for moving the carriage assembly between the retracted and support positions; the system including a manual pump to provide pressure to drive a hydraulic actuator connected to the carriage assembly, the method including the steps of:

pre-charging the hydraulic actuation system with pressurized fluid;

coupling the forward section of the towbar to the nose gear;

driving the tractor to deliver a towing force through the towbar to the nose gear;

stopping the tractor; and applying the pre-charged pressurized fluid to the actuator, thereby moving the carriage from the retracted position to the support position.

In an embodiment, the charging step is not required to occur prior to the coupling step and can occur at any time before the discharging step.

In an embodiment, the charging step includes delivering pressure from the manual pump.

In an embodiment, the charging step includes delivering pressure from a second pump. The second pump may be a piston-cylinder assembly mounted to be axially driven by tensile or compressive force through the towbar.

DETAILED DESCRIPTION OF THE DRAWINGS

Figure 1:
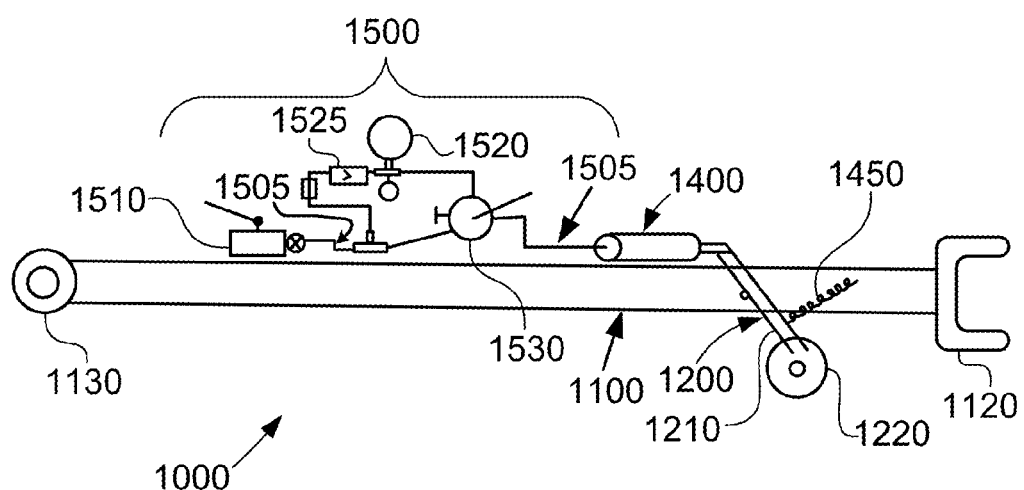
FIG. 1 is a schematic of an improved towbar.

Referring to FIG. 1, a towbar 1000 is illustrated. The towbar includes an elongate body 1100 having a forward end 1120 and a rearward end 1130. The forward end 1120 is adapted for coupling to a nose gear of an aircraft, and the rearward end 1130 is adapted for coupling to a tractor 250. The towbar 1000 further includes a carriage assembly 1200 having a carriage frame 1210 and at least two rotatable wheels 1220, wherein the frame 1210 is movably mounted to the body 1100. It should be apparent to those skilled it the art, however, that with an appropriate rearward end 1130 coupling, a single wheel may be employed. A spring 1450 biases the position of the carriage assembly 1200 relative to the body 1100. In the exemplary embodiment of FIG. 1, the hydraulic actuator 1400 includes a cylinder and axially displaceable piston. The hydraulic actuator 1400 is mounted to movably drive the carriage frame 1210 through a range of motion as described below in connection with FIG. 2.

Figure 2:
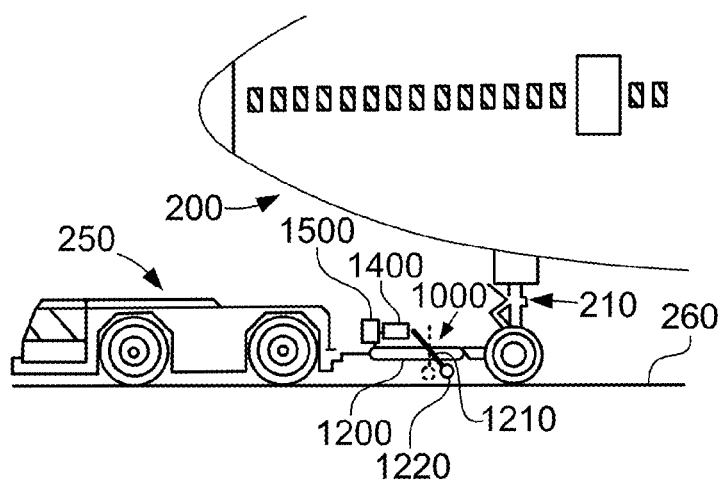
FIG. 2 is a side elevation illustrating tractor coupled to an aircraft by means of a towbar, the towbar having wheels in an retracted position.

Referring now to FIG. 2, the towbar 1000 is coupled between the nose wheel 210 of an aircraft 200 and a tractor 250. FIG. 2 illustrates the carriage frame 1210 in a retracted position in which the wheels 1220 are held upwardly, proximally to the body, above from the ground 260. The wheels 1220 are free from the ground, allowing the tractor 250 to move the aircraft 200 without impediment of the wheels. The dashed line in FIG. 2 illustrates the carriage frame 1210 in a support position in which the wheels 1220 are extended downwardly to the ground 260 to support the body 1100 elevated above the ground 260. The towbar 1000 can be decoupled from the nose gear 210 when the carriage assembly is in the support position, allowing the towbar 1000 to be rolled away under tow from the tractor 250, leaving the aircraft 200 free. The hydraulic actuator 1400 is configured to move the carriage assembly between the retracted position shown as a solid line and a dashed line showing the support position (FIG. 2).

Also shown in FIG. 1, the towbar 1000 includes a hydraulic circuit 1500 for controllably driving the actuator 1400. The hydraulic circuit 1500 includes a conduit 1505 and pump 1510 arranged to selectably deliver pressurized fluid through conduit to the actuator 1400. Additionally, the circuit 1500 includes a boost accumulator 1520 to store hydraulic pressure for driving the actuator at a desired time. The accumulator is a pressure storage reservoir in which a non-compressible hydraulic fluid is held under pressure by an external source. The external source can be a spring, a raised weight, or a compressed gas. The accumulator enables the hydraulic circuit to cope with extremes of demand using a less powerful pump, to respond more quickly to a temporary demand, and to smooth out pulsations. It is a type of energy storage device.

The circuit 1500 includes valves arranged as necessary to enable fluid communication through portions of the conduit. In particular, the circuit is arranged to generally enable the accumulator 1520 to selectively deliver fluid pressure through the conduit to the actuator 1400 to rapidly drive the carriage assembly 1200 from the retracted position to the support position (FIG. 2). Various hydraulic circuit arrangements embodiments are possible to accomplish this.

In the embodiment of FIG. 1, the hydraulic circuit 1500 includes a valve 1530 that can be selected among first, second, and third positions. When the valve 1530 is in the first position, the pump 1510 is in fluid communication through the conduit 1505 with the actuator 1400, bypassing the accumulator 1520. This allows an operator to move the wheels from the retracted position to the support position as driven directly by the pump 1510, as had been done with conventional towbars, albeit at conventional speed. This may be desired, for example, if the accumulator is not in a charged state, if the operator is not interested in speedy deployment of the wheels, or if the operator merely prefers it. When the valve 1530 is in the second position, the pump 1510 is in fluid communication with the accumulator 1520, bypassing the actuator 1400. The second position allows the operator to pre-pump the accumulator 1520 with a charge of pressurized fluid, while holding the actuator 1400 and carriage assembly 1200 fixed. The operator can charge the accumulator while the carriage assembly 1200 is fixed in either a wheels up or wheels down mode. When the valve 1530 is in the third position, the accumulator 1520 is in fluid communication with the actuator 1400, such that pressure from the accumulator drives the actuator to move the carriage assembly rapidly toward the support position. A one way valve 1525 prevents flow of fluid from accumulator 1520 back to pump 1510. When the carriage assembly 1200 is deployed such that the wheels are down, in an embodiment, the operator can move the valve back to the first position and "fine tune" the action with the pump 1510 if necessary.

In an embodiment, it may be ergonomically desirable to have the first, second, and third valve positions in a different arrangement. For example such that so that the first position allows pre-pumping the accumulator, the second position allows the accumulator to transfer the accumulator fluid to the actuator, quickly driving the wheels down, and in the third position to connect the hand pump to the cylinder. The valve positions are a matter of design choice.

The circuit also provides for selective release of pressure from the actuator to a reservoir, allowing the carriage assembly to move from the support position to the retracted position (FIG. 2) under force of the spring 1450 arranged to bias the carriage assembly to move to the retracted position.

For context, a typical aircraft departure operation will be described. An aircraft is loaded with a pilot crew and passengers or cargo at a gate or parked position, While the aircraft is in this parked position, a ground crew couples the towbar to the nose gear of the aircraft, and opposite end of the towbar is coupled to a tractor. The wheels of the towbar are then raised free of the ground. The aircraft crew starts the engines. The ground crew uses the tractor to "push out" the aircraft with the towbar, moving the aircraft to a clear location. Usually, one ground crew member walks near the towbar during this push out process. When the aircraft is in an appropriate clear location, the towbar can be decoupled. In order to decouple the towbar, the towbar wheels must be moved to the ground to elevate the body of the towbar, relieve the weight on the connection and allow it to be rolled away with the tractor, free of the aircraft.

Conventionally, once the aircraft has been pushed out to the clear location, the ground crew member near the towbar uses a hand pump to manually drive the actuator to move the wheels to the ground so that the towbar can be decoupled from the nose gear. This manual pumping is time consuming. The loaded aircraft waits, engines running and consuming fuel, until the towbar is eventually decoupled and pulled free.

A certain volume of fluid is required to displace an actuator to drive the wheels down on the towbar. In a conventional towbar, this volume of fluid is manually pumped by the ground crew member after the push, while the running aircraft waits. The improved towbar as described herein allows for a volume of fluid to be pumped into an accumulator by the ground crew at a convenient earlier time, before the moment when the aircraft is ready to be decoupled from the towbar. For example, the ground crew can pump a charge to the accumulator before the push, while they are waiting on the boarding process. Then when the operator needs to put the wheels down, it can be done with a simple turning of the valve on the new system and time can be saved. Turning the valve to allow the accumulator to push the fluid to the cylinder will take far less time than pumping the cylinder down. It is estimated that this would save at least several seconds over the conventional process.

Thus, a towbar 1000 equipped with improvements as described herein can advantageously move the wheels from a retracted position to a support position rapidly, allowing the towbar to be decoupled from the aircraft in significantly less time after push out than can be routinely achieved with conventional towbars. As a result, the aircraft consumes less fuel while waiting for the ground crew to clear tow equipment away, and the aircraft can depart sooner.

An improved method of moving an aircraft is provided in which these efficiencies can be realized. The method includes providing a towbar having the improved features described herein, including a boost accumulator that enables a hydraulic pressure to be stored for selective use to drive the actuator from the retracted position to the support position. The method also includes charging the boost accumulator to store pressurized fluid; coupling the forward section of the towbar to the nose gear; driving the tractor to push the aircraft with the towbar; stopping the tractor when the aircraft is in an appropriately clear location; and discharging the boost accumulator to drive the actuator to move the carriage from the retracted position to the support position. Notably, the step of charging the boost accumulator can occur at any time prior to the discharging step, not necessarily in the sequence described. Implementation of the improved equipment and method in routine practice can save significant time and expense, particularly on fuel consumed by a fleet of aircraft.

Certain conventional towbars could be modified to implement the improved features described herein. Those of skill in the art that various embodiments will be possible. Some alternative examples are described below.

Figure 3:
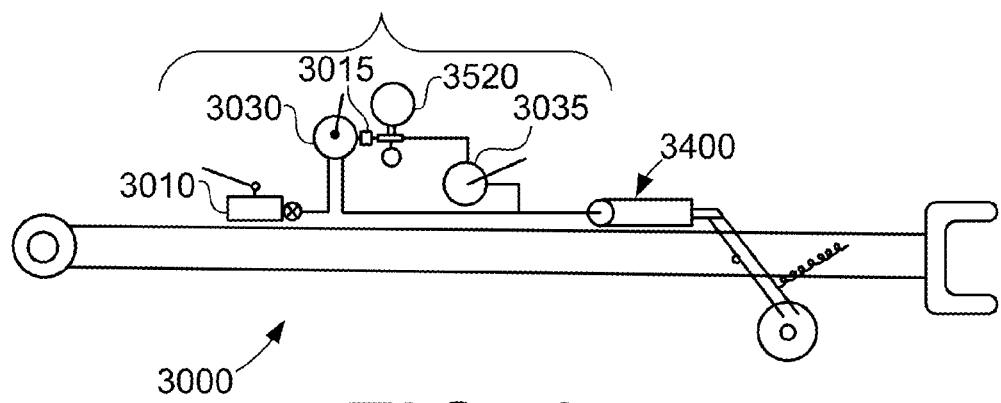
FIG. 3 is a schematic of an improved towbar including an alternative valve arrangement.

Referring to FIG. 3, a towbar 3000 is illustrated including two valves 3030 and 3035. Valve 3030 is a two way port that either connects pump 3010 to actuator 3400 or to the accumulator 3520 via a one way check valve 3015. In a first position the pump 3010 is in communication with actuator 3400 for driving the actuator directly with the pump. In the second position the operator uses the pump 3010 to preload the accumulator 3520 with hydraulic fluid. The operator preloads the accumulator before the push, goes back to the original valve position, the push commences and then when he is ready to lower the wheels another on/off valve 3035 that is teed into the cylinder line is momentarily opened to transfer the fluid from the accumulator to the cylinder, The pump 3010 is already connected directly to the actuator and the fine tuning process can be instantly accomplished, saving time.

Figure 4:
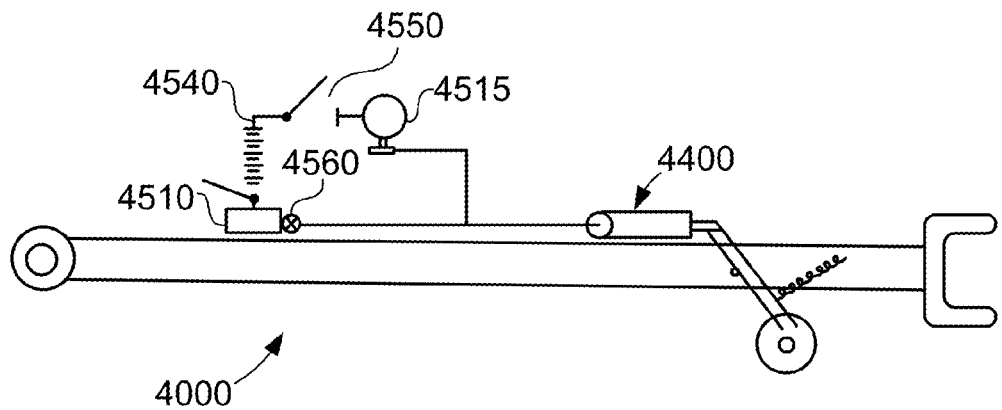
FIG. 4 is a schematic of an improved towbar including an electric pump and a manually operated pump.
Figure 5:
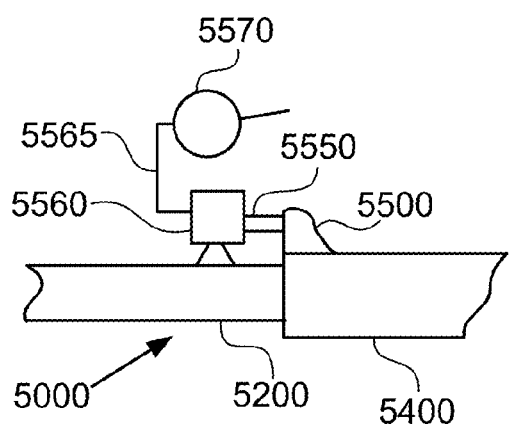
FIG. 5 is a schematic of an improved towbar.

Another embodiment shown in FIG. 4 provides towbar 4000 including a powered. hydraulic pump 4515, such as an electric pump, in addition to a manual hand pump 4510, as illustrated in FIG. 5. This powered pump 4515 can be battery operated by a battery 4540 through a switch 4550 and recharged between departure operations, The electric pump 4515 could deliver fluid quickly, thereby saving time over a manual pumping operation only. A valve 4560 is provided to selectively close off fluid communication of the hand pump 4510 during operation of the powered pump 4515.

In an alternative embodiment, the carriage assembly could be configured such that one or more spring(s) biases the carriage assembly and wheels downwardly toward to the support position. The actuator would move the wheels toward the retracted position, against the spring bias. Such an embodiment would preferably also include a fine tuning mechanism to seat the wheels and support the towbar in a controlled manner.

In yet another embodiment, an additional arm may be employed to force the actuator cylinder open drawing fluid through a bypass valve that is parallel with the hydraulic line between the pump and cylinder. The cylinder would suck the fluid from the reservoir more quickly than it could be pumped and then the hand pump would be used to fine tune the load. Of course, care must be taken to make sure the arm stays clear from the airplane.

In still another embodiment, the reactive force of pushing the aircraft away from its gate may be used to charge up the accumulator by an articulated joint on the towbar that is connected to a means for pressurizing the accumulator. As illustrated in FIG. 5, a towbar 5000 has sections 5200 and 5400 telescoped or articulated with respect to one another. Section 5400 has an arm 5500 connected to a pump 5560 by a rod 5550, Pump 5560 is connected to section 5200 so that relative movement between the sections 5200 and 5400 causes pump 5560 to pressurize hydraulic fluid and to deliver it to accumulator 5570 via line 5565. The connections with the actuator and manual pump are like the other embodiments so these will not be repeated. The embodiment of FIG. 5 uses the action of pushing an aircraft away from the gate to pre-charge the accumulator in the hydraulic system so that a rapid release of the aircraft is possible.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A towbar for towing an aircraft, the towbar comprising:
an elongate body having a forward end adapted for coupling to a nose gear of an aircraft and a rearward end adapted for coupling to a tractor;
a carriage assembly including a carriage frame, at least one wheel rotatably mounted to the carriage frame, the carriage frame being movably mounted to the body for movement between (a) a retracted position in which the wheel is held upwardly and (b) a support position in which the wheel is extended downwardly to the ground to support the body elevated above the ground when the forward end is decoupled from the nose gear;
a hydraulic actuator for moving the carriage assembly between the retracted and support positions;
a manual pump to provide pressure to drive the hydraulic actuator; and
a hydraulic accumulator that stores hydraulic pressure for selective use to drive the actuator from the retracted position to the support position; and
a valve movable between at least first and second positions, such that in the first position the accumulator is in hydraulic communication with the manual pump to allow the pump to charge the accumulator with fluid pressure bypassing the actuator and in the second position the pump is in fluid communication with the actuator, whereby discharge pressure from the accumulator drives the actuator to move the carriage assembly toward the support position.

2. The towbar of claim 1 further comprising an auxiliary pump arranged to deliver pressurized fluid to charge the boost accumulator upon, the auxiliary pump driven by compressive or tensile forces through the towbar that result from pushing or pulling the aircraft.

3. A method of efficiently moving and decoupling an aircraft using a towbar, that includes a body having forward section adapted for coupling to a nose gear of an aircraft and a rearward end coupled to a tractor, a carriage assembly including a carriage frame, at least one wheel rotatably mounted to the carriage frame, the carriage frame being movably mounted to the body for movement between (a) a retracted position in which the wheel is held upwardly and (b) a support position in which the wheel is extended downwardly to support the towbar on the ground; a hydraulic actuation system for moving the carriage assembly between the retracted and support positions; the system including a manual pump to provide pressure to drive a hydraulic actuator connected to the carriage assembly , said method comprising the steps of:
pre-charging the hydraulic actuation system with pressurized fluid;
coupling the forward section of the towbar to the nose gear;
driving the tractor to deliver a towing force through the towbar to the nose gear;
stopping the tractor; and
applying the pre-charged pressurized fluid to the actuator, thereby moving the carriage from the retracted position to the support position.

4. The method of claim 3, whereby the charging step is not required to occur prior to the coupling step and can occur at any time before the discharging step.

5. The method of claim 4, whereby the charging step includes delivering pressure from the manual pump.

6. The method of claim 4, whereby the charging step includes delivering pressure from a second pump.

7. The method of claim 6, whereby the second pump is a manual pump.

8. The method of claim 7, whereby the second pump is a piston mounted to be axially driven by one of tensile and compressive force through the towbar.

9. A towbar for towing an aircraft, said towbar comprising:
an elongate body having a forward end adapted for coupling to a nose gear of an aircraft and a rearward end adapted for coupling to a tractor;
a carriage assembly including a carriage frame, at least one wheel rotatably mounted to the carriage frame, the carriage frame being movably mounted to the body for movement between (a) a retracted position in which the wheel is held upwardly and (b) a support position in which the wheel is extended downwardly to the ground to support the body elevated above the ground when the forward end is decoupled from the nose gear;
a hydraulic actuation system for moving the carriage assembly between the retracted and support positions; said system including a manual pump to provide pressure to drive a hydraulic actuator connected to the carriage assembly;

a device for charging and maintaining the hydraulic actuation system with pressurized fluid bypassing said actuator at a level sufficient to drive said actuator to displace said carriage to said support position; and, at least one valve operable to connect the pressurized fluid in said hydraulic system independent of said manual pump to drive the actuator to move the carriage assembly to the support position.

10. The towbar of claim 9 wherein said charging device is a hydraulic accumulator that stores hydraulic pressure for selective use to drive the actuator from the retracted position to the support position.

11. The towbar of claim 10 wherein said valve is movable between at least first and second positions, such that in the first position the accumulator is in hydraulic communication with the manual pump to allow the pump to charge the accumulator with fluid pressure and in the second position the pump is in fluid communication with the actuator.

12. The towbar of claim 10 including a pair of valves, one of which has two positions the first of which connects the pump with said actuator for driving the actuator directly with the pump and a second position wherein the pump is connected to preload the accumulator with hydraulic fluid, the second valve selectively connecting said accumulator with said actuator.

13. The towbar of claim 10 wherein said charging device is an electrically driven pump in communication with said actuator and selectively operable to drive said actuator.

* * * * *